(12) United States Patent
Imai et al.

(10) Patent No.: US 7,983,120 B2
(45) Date of Patent: Jul. 19, 2011

(54) OPTICAL DISK APPARATUS, FOCUS CONTROL METHOD AND OPTICAL DISK

(75) Inventors: Takeshi Imai, Fujisawa (JP); Hiroshi Minoda, Yokohama (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 702 days.

(21) Appl. No.: 11/542,154

(22) Filed: Oct. 4, 2006

(65) Prior Publication Data

US 2007/0171781 A1 Jul. 26, 2007

(30) Foreign Application Priority Data

Jan. 26, 2006 (JP) ................................. 2006-017317

(51) Int. Cl.
*G11B 7/00* (2006.01)
(52) U.S. Cl. .................. 369/44.29; 369/53.28
(58) Field of Classification Search .......... None
See application file for complete search history.

(56) References Cited

U.S. PATENT DOCUMENTS

| | | | | |
|---|---|---|---|---|
| 5,903,530 | A * | 5/1999 | Tateishi et al. | 369/44.27 |
| 6,370,093 | B1 * | 4/2002 | Tada et al. | 369/44.25 |
| 6,756,574 | B2 * | 6/2004 | Higuchi | 250/201.2 |
| 7,143,426 | B2 | 11/2006 | Mishima et al. | |
| 2003/0063530 | A1 * | 4/2003 | Takehara et al. | 369/44.23 |
| 2004/0139459 | A1 * | 7/2004 | Mishima et al. | 720/718 |
| 2005/0253210 | A1 | 11/2005 | Uno et al. | |
| 2005/0276212 | A1 * | 12/2005 | Kato et al. | 369/275.1 |

FOREIGN PATENT DOCUMENTS

| | | |
|---|---|---|
| JP | 11-039663 | 2/1999 |
| JP | 2000-057593 | 2/2000 |
| JP | 2000-200429 | 7/2000 |
| JP | 2001-155380 | 6/2001 |
| JP | 2002-304746 | 10/2002 |
| JP | 2003-123272 | 4/2003 |
| JP | 2004-192784 | 7/2004 |
| JP | 2004-213720 | 7/2004 |
| JP | 2009-15878 | 1/2009 |
| WO | WO 2004/027770 | 4/2004 |
| WO | WO 2007/049605 | 5/2007 |

OTHER PUBLICATIONS

Machine translation of JP 11-039663 A into English, Kimura et al.*

* cited by examiner

*Primary Examiner* — Wayne R Young
*Assistant Examiner* — Brian Butcher
(74) *Attorney, Agent, or Firm* — Antonelli, Terry, Stout & Kraus, LLP.

(57) ABSTRACT

The present invention provides an optical disk apparatus capable of stably performing a layer jump on an optical disk having plural recording layers and non-uniform interlayer distances. In an optical disk with at least three recording layers and non-uniform interlayer distances between respective recording layers, if a layer jump is carried out from a first recording layer to a second recording layer, a distance from the first recording layer to the second recording layer is obtained and driving voltages set according to the distance are applied to an actuator for the layer jump to carry out the layer jump. At this time, interlayer distances for combinations of the respective recording layers and applied driving voltages thereto are stored in a memory in advance and when necessary, corresponding driving voltages are read out from the memory and are set for the layer jump.

7 Claims, 10 Drawing Sheets

| LAYER JUMP PATTERN | JUMP DISTANCE | ACCELERATING VOLTAGE Va | INTERMEDIATE VOLTAGE Vm | BRAKE VOLTAGE Vb |
|---|---|---|---|---|
| RECORDING LAYER 1 ⟷ RECORDING LAYER 2 | y12 | Va12 | Vm12 | Vb12 |
| RECORDING LAYER 1 ⟷ RECORDING LAYER 3 | y12+y23 | Va13 | Vm13 | Vb13 |
| RECORDING LAYER 1 ⟷ RECORDING LAYER 4 | y12+y23+y34 | Va14 | Vm14 | Vb14 |
| RECORDING LAYER 2 ⟷ RECORDING LAYER 3 | y23 | Va23 | Vm23 | Vb23 |
| RECORDING LAYER 2 ⟷ RECORDING LAYER 4 | y23+y34 | Va24 | Vm24 | Vb24 |
| RECORDING LAYER 3 ⟷ RECORDING LAYER 4 | y34 | Va34 | Vm34 | Vb34 |

| INTERLAYER DISTANCE y | | POSITION OF JUMP DESTINATION | | | |
|---|---|---|---|---|---|
| | | RECORDING LAYER 1 | RECORDING LAYER 2 | RECORDING LAYER 3 | RECORDING LAYER 4 |
| POSITION OF JUMP SOURCE | RECORDING LAYER 1 | — | y12 | y12+y23 | y12+y23+y34 |
| | RECORDING LAYER 2 | y12 | — | y23 | y23+y34 |
| | RECORDING LAYER 3 | y12+y23 | y23 | — | y34 |
| | RECORDING LAYER 4 | y12+y23+y34 | y23+y34 | y34 | — |

FIG.4

| LAYER JUMP PATTERN | JUMP DISTANCE | ACCELERATING VOLTAGE Va | INTERMEDIATE VOLTAGE Vm | BRAKE VOLTAGE Vb |
|---|---|---|---|---|
| RECORDING LAYER 1 ⟷ RECORDING LAYER 2 | y12 | Va12 | Vm12 | Vb12 |
| RECORDING LAYER 1 ⟷ RECORDING LAYER 3 | y12+y23 | Va13 | Vm13 | Vb13 |
| RECORDING LAYER 1 ⟷ RECORDING LAYER 4 | y12+y23+y34 | Va14 | Vm14 | Vb14 |
| RECORDING LAYER 2 ⟷ RECORDING LAYER 3 | y23 | Va23 | Vm23 | Vb23 |
| RECORDING LAYER 2 ⟷ RECORDING LAYER 4 | y23+y34 | Va24 | Vm24 | Vb24 |
| RECORDING LAYER 3 ⟷ RECORDING LAYER 4 | y34 | Va34 | Vm34 | Vb34 |

| ADDRESS | INTERLAYER | INTERLAYER DISTANCE NUMBER |
|---|---|---|
| BYTE 0 | RECORDING LAYER 1 AND 2 | 00h |
| BYTE 1 | RECORDING LAYER 2 AND 3 | 03h |
| BYTE 2 | RECORDING LAYER 3 AND 4 | 00h |
| BYTE 3 | RECORDING LAYER 4 AND 5 | 03h |
| BYTE 4 | RECORDING LAYER 5 AND 6 | 01h |
| BYTE 5 | RECORDING LAYER 6 AND 7 | 04h |
| BYTE 6 | RECORDING LAYER 7 AND 8 | 02h |
| ~ | ~ | ~ |
| BYTE X | RECORDING LAYER x+1 AND x+2 | 00h |

FIG.15B

| INTERLAYER DISTANCE NUMBER | INTERLAYER DISTANCE ($\mu$m) |
|---|---|
| 00h | 9.5 |
| 01h | 10.5 |
| 02h | 12.0 |
| 03h | 13.5 |
| 04h | 16.0 |

OPTICAL DISK APPARATUS, FOCUS CONTROL METHOD AND OPTICAL DISK

CLAIM OF PRIORITY

The present application claims priority from Japanese application Ser. no. JP 2006-017317, filed on Jan. 26, 2006, the content of which is hereby incorporated by reference into this application.

BACKGROUND OF THE INVENTION (1) Field of the Invention

The present invention relates to a multi-layer optical disk having plural recording layers, more specifically, to an optical disk apparatus capable of stably performing a layer jump, a focus control method and an optical disk.

(2) Description of the Related Art

A multi-layer optical disk having plural recording layers is required of an operation in which an object lens shifts to change (or switch) recording/reproducing layers and a focus position is changed from one layer to another layer (layer jump). In general, a DVD disk has a standardized double recording layer structure. In addition, a number of technologies are available in regard to the layer jump for disks having at least three recording layers.

Japanese Patent Laid-Open Publication No. 2003-123272 discloses an acceleration and deceleration treatment involving a layer jump from a first layer to a third layer, interlacing a second layer, and a deceleration control method on the basis of a focus error signal output from the third layer.

Japanese Patent Laid-Open Publication No. 2004-192784 discloses a high-precision control of a layer jump for a three-layer BD using an objective lens with a high NA (numerical aperture) of at least 0.8. Since a permitted limit of the focal length of such object lens is very narrow, a deceleration treatment on the layer jump is divided into a first acceleration and a second acceleration.

In addition, Japanese Patent Laid-Open Publication No. 2002-304746 discloses a technology for controlling the timing of an acceleration voltage (pulse) and a deceleration voltage (pulse) during a layer jump in a multilayer disk, each layer having different characteristics, is controlled based on the intensity of 2-layer reflected light.

SUMMARY OF THE INVENTION

Each of the above conventional technologies is based on an assumption that a layer jump is carried out and that an interlayer distance between layers is uniform. However, a new multi-layer disk structure having non-uniform interlayer distances has been reported. It was explained that by varying interlayer distances, the amount of reflected light from each layer is uniform and a signal reproduction becomes possible even in an eight-recording layer structure.

Therefore, for multi-layer disks developed henceforth, it is necessary to prepare how to deal with those disks having different interlayer distances for every layer. In addition, as it is evident that the number of layers is going to be increased in future, it is required to more stably execute not only a layer jump between neighboring layers but also an interlaced jump. The above-described conventional technologies set acceleration and deceleration conditions for a layer jump uniformly, so an optimum control is not always made especially in the case that interlayer distances are different or during an interlaced jump. Generally, a positioning after jump is operated based on a focus error signal. Thus, if a jump destination deviates from a target position and therefore, no focus error signal is detected (jump is failed), the jump operation has to be started up again, spending so much time.

It is, therefore, an object of the present invention to provide a way for stably performing a layer jump from one recording layer to a random recording layer especially in an optical disk having plural recording layers with different interlayer distances.

In order to solve the above-mentioned problem, there is provided an optical disk apparatus recording and reproducing data onto and from an optical disk with at least three recording layers and non-uniform interlayer distances between respective recording layers; the apparatus including: a disk motor which rotates the optical disk; a pickup which condenses a laser beam onto an objective lens and irradiates the laser beam onto a desired recording surface of the optical disk for data recording/reproduction; a signal processing circuit which processes the recorded/reproduced data and, at the same time, generates a focus error signal from a signal detected by the pickup; and a control unit which drives an actuator based on the focus error signal and thereby, controls a focus position of the objective lens; wherein, when a layer jump is carried out from a first recording layer to a second recording layer of the optical disk, the control unit obtains a distance from the first recording layer to the second recording layer, sets driving voltages which vary depending on the distance to the actuator, and carries out the layer jump with the set driving voltages.

In addition, the above-described optical disk apparatus further includes: a memory which stores interlayer distances and applied driving voltages for combinations of respective recording layers within the optical disk in advance and when a layer jump is carried out from the fist recording layer to the second recording layer, the control unit reads out corresponding driving voltages from the memory and sets the same. Here, the driving voltages include an acceleration voltage for a start-up process, an intermediate voltage and a brake voltage for a stopping process.

In addition, when a layer jump is carried out from the first recording layer to the second recoding layer while skipping a third layer midway therebetween, the control unit obtains a speed passing the third recording layer and adjusts the driving voltage according to the passing speed. Here, the passing speed is obtained from a period of a focus error signal waveform generated by the signal processing circuit.

Another aspect of the present invention provides a focus control method of an optical disk with at least three recording layers and non-uniform interlayer distances between respective recording layers, the method including the steps of: when a layer jump is carried out from a first recording layer to a second recording layer of the optical disk, obtaining a distance from the first recording layer to the second recording layer; setting driving voltages according to the distance and applying the same to the actuator; and carrying out the layer jump with the set driving voltages.

The above-described method further includes the steps of: storing interlayer distances and applied driving voltages for combinations of respective recording layers within the optical disk in a memory in advance, and when a layer jump is carried out from the fist recording layer to the second recording layer, reading out corresponding driving voltages from the memory and setting the same.

Still another aspect of the present invention provides an optical disk having at least three recording layers and non-uniform interlayer distances between respective recording layers, wherein information of the interlayer distances between the respective recording layers is recorded in a management information region of the optical disk.

According to the present invention, even an optical disk having plural recording layers and especially different interlayer distances, a layer jump operation can be performed very stably and a recording/reproducing operation can be done smoothly.

DESCRIPTION OF THE PREFERRED EMBODIMENTS

Figure 1:
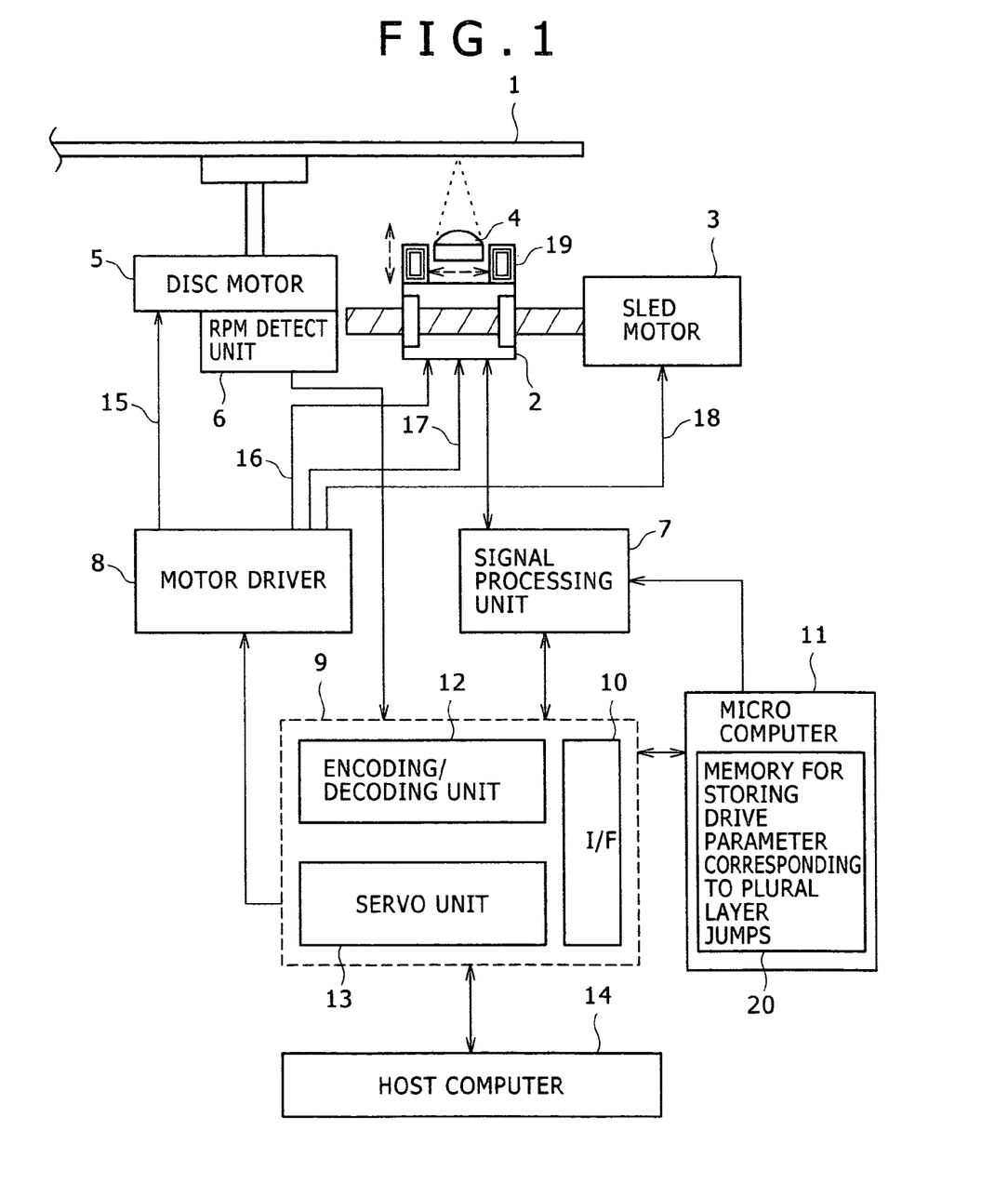
FIG. 1 is a block diagram of an optical disk apparatus according to one embodiment of the present invention.

FIG. 1 is a block diagram of an optical disk apparatus according to one embodiment of the present invention. A multi-layer optical disk 1 mounted at the apparatus is rotated by an optical disk motor 5 and its rotation speed is detected by a RPM detection unit 6. A pickup 2 irradiates a laser light from a semiconductor laser onto a recording surface of the optical disk 1 to record or reproduce data onto or from the disk. The pickup 2 has a built-in objective lens 4 and a focusing and tracking actuator 19 for adjusting a position of the objective lens 4, and focuses the laser light onto a desired recording surface and onto a desired track. A sled motor 3 moves the pickup 2 in a radial direction on the optical disk. A motor driver 8 provides driving signals 15, 16, 17 and 18 for driving the disk motor 5, the sled motor 3 and the actuator 19.

A signal processing unit 7 not only generates a recording signal to be sent to the pickup 2, but also processes read signals from the pickup 2 to generate a focus error signal, a tracking error signal, and an RF signal. A digital signal processor (DSP) 9 includes an interface 10, an encoding/decoding unit 12, and a servo unit 13. The interface 10 transmits recording/reproduced data or a command between a host computer 14 from the outside and the optical disk apparatus. The encoding/decoding unit 12 encodes recorded data and decodes a reproduced RF signal between the signal processing unit 7 and the optical disk apparatus. The servo unit 13 generates a focusing or tracking servo signal from a detected focus error signal, a tracking error signal and a rotation speed signal being received and sends the signal(s) to the motor driver 8.

A micro computer 11 controls the overall apparatus and, at the same time, controls a layer jump operation on a multi-layer optical disk. In detail, a memory 20 in the micro computer 11 stores a driving parameter corresponding to plural layer jumps and by referring to the parameter, the apparatus sets a driving condition (driving voltage) for the actuator 19 to execute a layer jump more stably.

Figure 2:
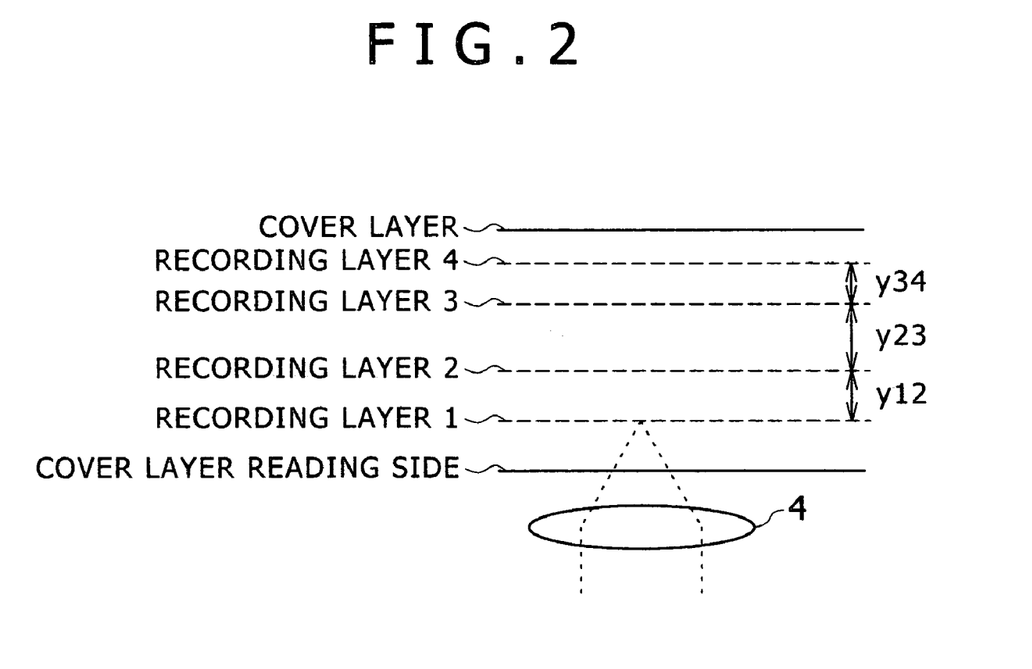
FIG. 2 is a schematic diagram showing the configuration of a 4-layer disk.

FIG. 2 is a schematic diagram showing the configuration of a 4-layer disk which is especially targeted in the present embodiment. As shown in the drawing, a recording layer 1 to a recording layer 4 are sequentially formed having spacer layers in-between. An interlayer distance of the respective recording layer is expressed in a symbol y. Reference numeral y12 denotes a distance between the recording layer 1 and the recording layer 2. In this embodiment, it is assumed that the interlayer distances y are not uniform and has a relation of y34<y12<y23. For example, in case of a BD (Blu-ray) multi-layer disk, interlayer distances y are set non-uniformly in a range from 10 to 20 μm. The objective lens 4 gathers or condenses a laser beam for use in recording and reproducing information and focuses on a target recording layer. And, when a layer jump is to be carried out, the objective lens 4 is driven by the actuator, thereby moving a focus point from one recording layer to another recording layer.

Figure 3:
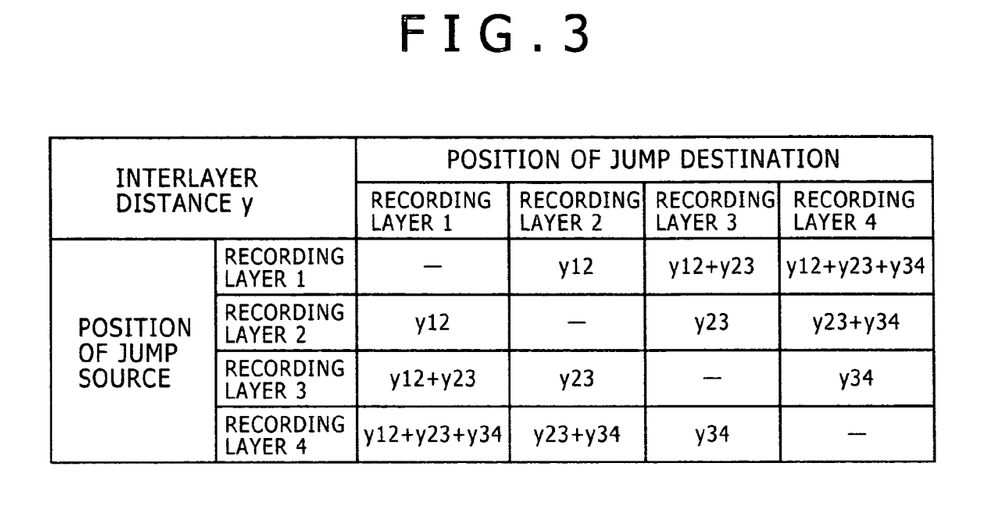
FIG. 3 diagrammatically shows jump distances at a 4-layer disk.

FIG. 3 diagrammatically shows jump distances at the 4-layer disk. There are 6 types of jump patterns (or jump distances) (here, jumping directions are not specified) as a result of the combination of recording layers functioning as a jump source and recording layers functioning as a jump destination. Here, the interlayer distance of the respective recording layer is a known value set by media standards. Therefore, there is no need to measure every single jump distance because one can easily get it by numbering recording layers of a jump source and a jump destination. And, a driving parameter set for a jump per distance is stored in the memory 20.

Figure 4:
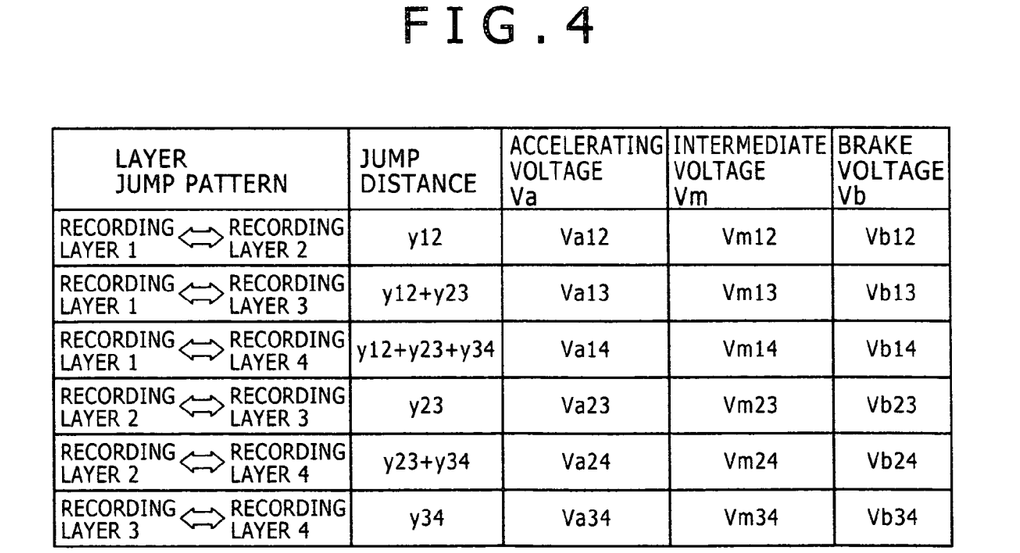
FIG. 4 illustrates an example of driving parameters of a layer jump in a 4-layer disk.

FIG. 4 illustrates an example of driving parameters of a layer jump in the 4-layer disk. Examples of such driving parameters of the actuators for 6 jump patterns with different jump distances include acceleration voltage Va, intermediate voltage Vm, and brake voltage Vb. Thus, the actuator is accelerated by the acceleration voltage Va, maintains the speed by the intermediate voltage Vm, and decelerates and eventually stops by the brake voltage Vb as it approaches a jump destination. These driving voltage values are optimally set by jump distances in consideration of the driving characteristics. Basically, the greater the jump distance, the larger the individual voltage value. Because of this, a jump failure due to speed loss in the case of a great jump distance (in this case, a focus servo for example is used for a nearest recording layer to the pickup side and the jump has to be carried out again to a desired recording layer from there) can be avoided, and the time required for a jump operation can be shortened. The combination of driving parameters mentioned here is the most basic example, and therefore other parameters may be added to conduct a high-precision control.

Although FIG. 4 illustrated a table of driving parameters for a 4-layer disk, a little modification thereof can also be applied to a layer jump operation of an optical disk having more than 5 recording layers.

Embodiment 1

Figure 5:
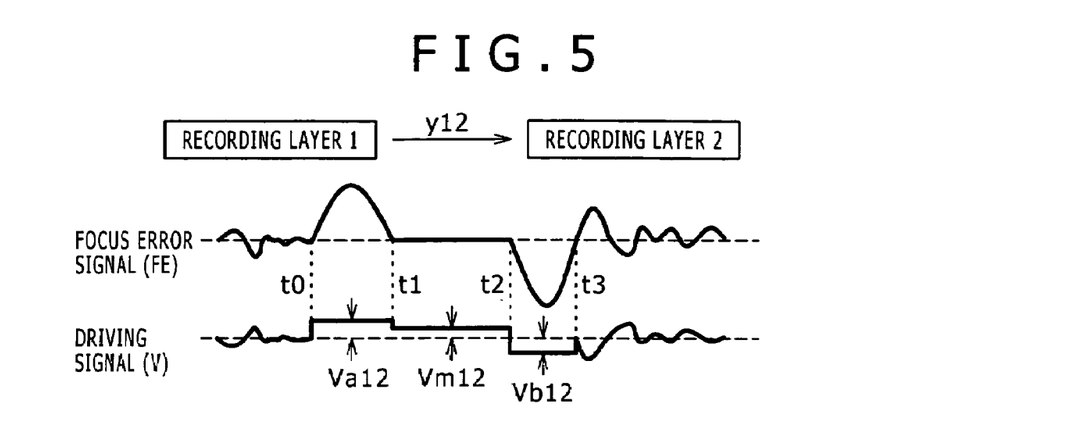
FIG. 5 illustrates an example of driving signals that are applied for carrying out a layer jump.
Figure 6:
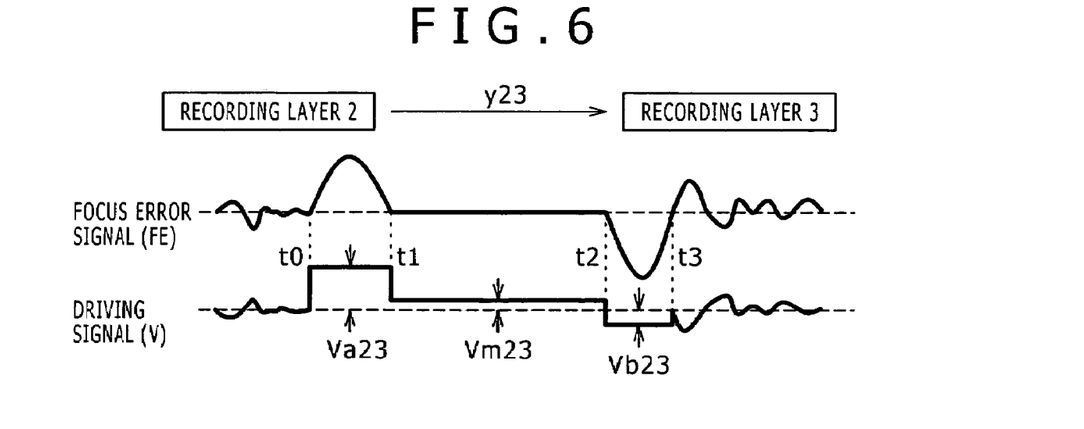
FIG. 6 illustrates an example of driving signals that are applied for carrying out a layer jump.
Figure 7:
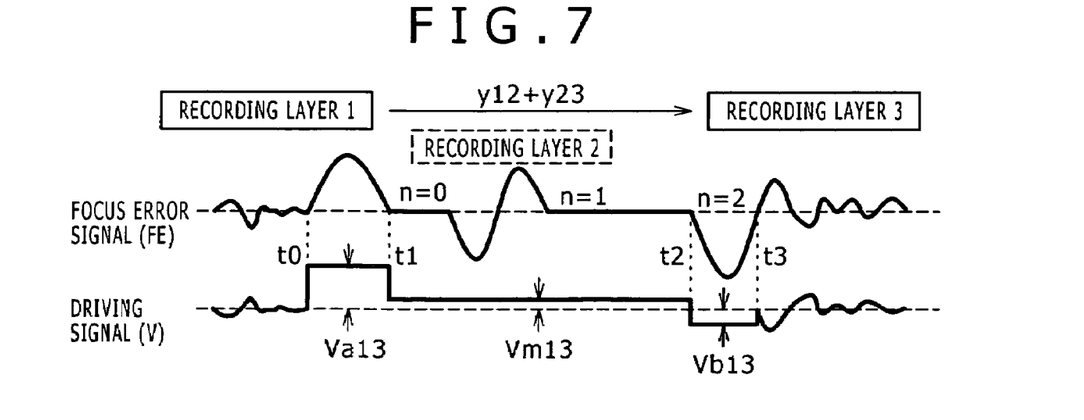
FIG. 7 illustrates an example of driving signals that are applied for carrying out a layer jump.

FIG. 5 to FIG. 7 are drawings illustrating driving signals that are applied for carrying out a layer jump in a 4-layer disk having different jump distance from each other.

FIG. 5 shows a case in which the jump distance is short, that is, a jump operation is carried from the recording 1 to the recording layer 2 in FIG. 2 (jump distance, y12). At t0, the acceleration voltage Va12 for a jump is applied to the actuator, and an objective lens is moved. Since a focus of a laser light emitted from the objective lens deviated from the recording layer 1, the pickup 2 detects a signal having an S-shaped waveform as shown in the drawing as a focus error signal FE. Meanwhile, at t1 where the S-shaped waveform is disappeared separated from an area on the recording layer 1, the voltage waveform is changed into an intermediate voltage Vm12. The Vm12 is for maintaining the present speed and thus, is smaller than the acceleration voltage Va12. Upon reaching a jump destination, an area on the recording layer 2, an S-shaped waveform of the FE signal exhibiting the deviation between the focus of the laser beam and the focus of the recording layer 2. At t2 having the S-shaped waveform, the brake voltage Vb12 is now applied to the actuator. The Vb12 has a reverse polarity signal, and decelerates the movement of the objective lens. At t3 where the FE signal turns to a predetermined voltage (close to zero), a jump driving voltage is off and the actuator is stopped. Afterwards, a record reproduction operation is carried out through a focus servo control focusing onto the recording layer 2.

Meanwhile, FIG. 6 shows a case in which the jump distance is long, that is, a jump operation is carried from the recording 2 to the recording layer 3 in FIG. 2 (jump distance, y23). The basic steps are the same as those in FIG. 5, but since the jump distance is long in this case, an applied driving voltage is set high. That is, all the voltages, the acceleration voltage Va23, the intermediate voltage Vm23, and the brake voltage Vb23, are set higher than the Va12, the Vm12 and the Vb12, respectively. In this manner, the jump operation can be succeeded without interruption in the middle due to speed loss.

FIG. 7 shows a case in which an interlaced jump is carried out from the recording layer 1 to the recording layer 3 in FIG. 2, so the jump distance (=y13) in this case increases even more. In this situation, an applied driving voltage should be set very high. That is to say, all the voltages, the acceleration voltage Va13, the intermediate voltage Vm13, and the brake voltage Vb13, are set higher than the voltages in FIG. 5 and the voltages in FIG. 6, respectively. Moreover, as the recording layer 2 is interlaced during the jump, the FE signal thusly obtained here exhibits the deviation between the focus of the recording layer 2 and the focus of the laser beam. In case of the interlaced jump, the total number of occurrences of the FE signal (S-shaped waveform) in the middle of the interlaced jump is counted to decide whether it is the recording layer of a jump destination. In such case, the first S-shaped waveform (n=1) after start is skipped and the second S-shaped waveform (n=2) is targeted.

According to this embodiment, an optimum driving voltage can be set by jump distances. Thus, a layer jump even in a multi-layer disk having non-uniform interlayer distances can be carried out very stably without failure.

Embodiment 2

FIG. 8 to FIG. 11 are drawings showing ano example of driving signals applied for an interlaced jump. More specifically, an adjustment voltage Vt is additionally applied between an intermediate voltage Vm and a brake voltage Vb.

Figure 8:
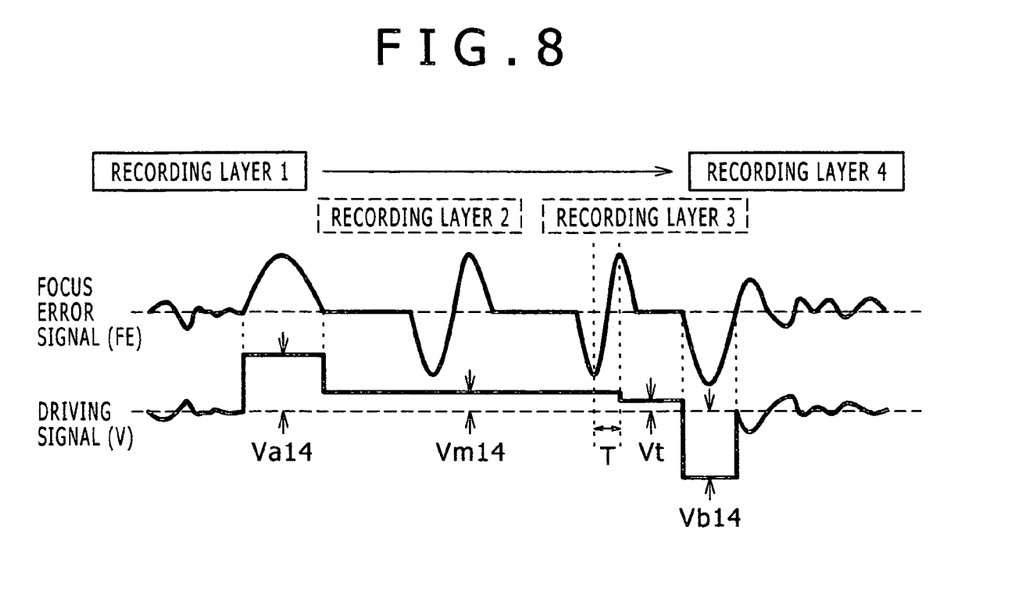
FIG. 8 illustrates an example of driving signals that are applied for carrying out an interlaced jump.

FIG. 8 illustrates an interlaced jump from a recording layer 1 to a recording layer 4 of a 4-layer disk, while skipping recording layers 2 and 3 on the way. An acceleration voltage Va14, an intermediate voltage Vm14, and a brake voltage Vb14 are set as above, and an adjustment voltage Vt is newly applied from the recording layer 3 (which is just one layer before a jump destination) to the targeted recording layer 4. Namely, a period T of an FE signal (S-shaped waveform) obtained from the recording layer 3 is measured and based on this T, the adjustment voltage Vt to be applied is determined. Here, the period of the FE signal indicates a time width T of peak-to-peak (from the lowest peak to the highest peak) of the S-shaped waveform, and it indicates the speed of the actuator passing the recording layer 3. The period T (i.e., a passing speed) is compared with a predetermined value to adjust the Vt. The drawing shows a case in which the passing speed is greater than the predetermined value, so the Vt was set below the Vm14 for deceleration. Through this speed adjustment, a subsequent decelerating operation can be done more stably. Later, the brake voltage Vb was applied to ensure that the actuator completely stops at the recording layer 4 of the jump destination.

Figure 9:
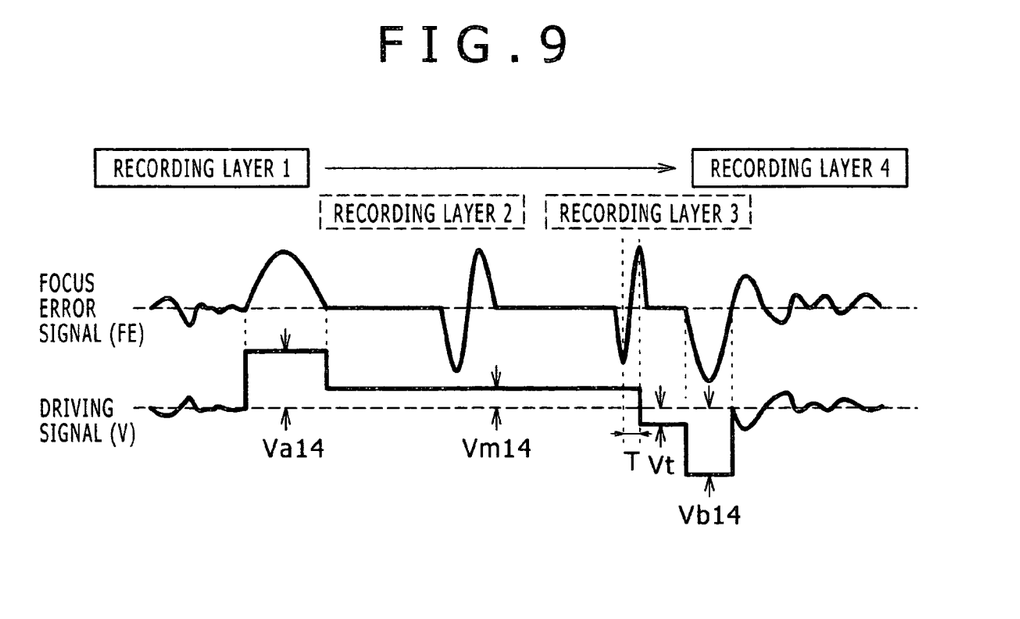
FIG. 9 illustrates an example of driving signals that are applied for carrying out an interlaced jump.

Similar to FIG. 8, FIG. 9 also illustrates an interlaced jump from the recording layer 1 to the recording layer 4, but the period T of the FE signal at the recording layer 3 is much smaller. If that is the case, the passing speed of the actuator at the recording layer 3 increases a lot, so a brake voltage of reverse polarity with respect to the acceleration voltage or the intermediate voltage should be impressed as the adjustment voltage Vt.

Figure 10:
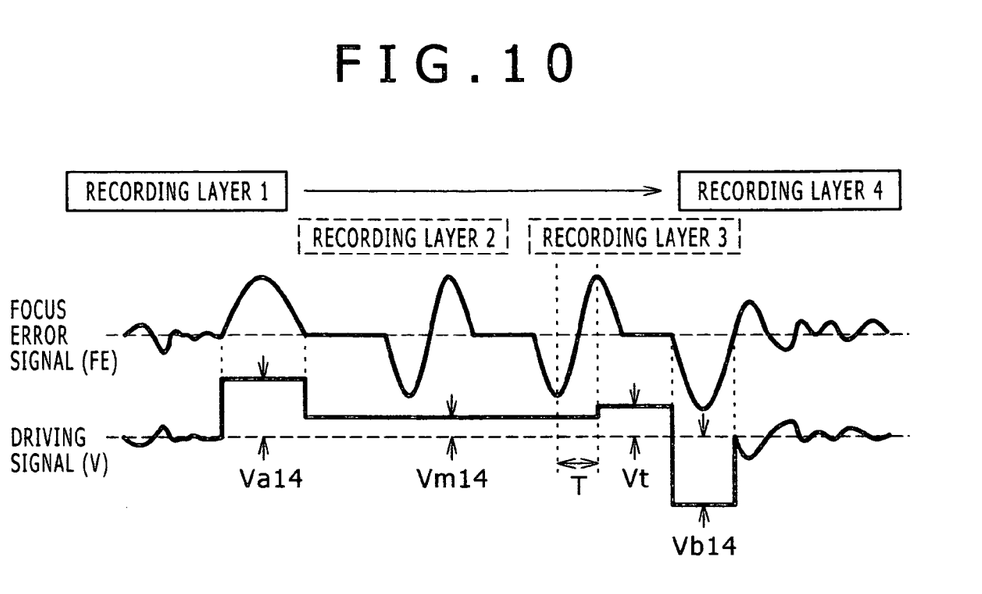
FIG. 10 illustrates an example of driving signals that are applied for carrying out an interlaced jump.

Similar to FIG. 8, FIG. 10 also illustrates an interlaced jump from the recording layer 1 to the recording layer 4, but the period T of the FE signal at the recording layer 3 is very large. If that is the case, the passing speed of the actuator at the recording layer 3 is smaller than the predetermined value, so the adjustment voltage Vt is increased above the Vm14, causing the actuator to accelerate.

Figure 11:
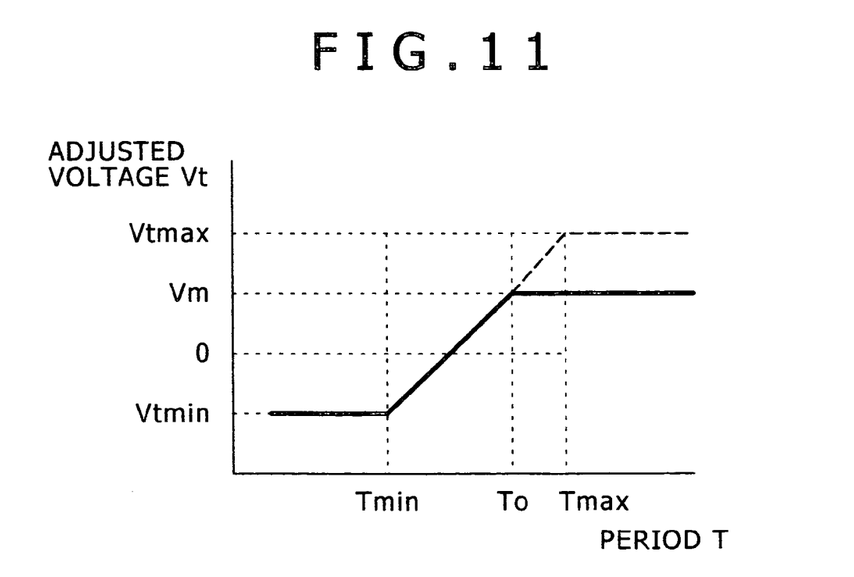
FIG. 11 diagrammatically shows a relation between period T of an FE signal and adjustment voltage Vt.

FIG. 11 shows a relation between the period T of the FE signal as it passes through a previous recording layer and the adjustment voltage Vt. A target value To of the period T is set, and an adjustment voltage Vt is set by comparison with To. Even though Vt is determined in proportion to T, it is all right to have a maximum Vtmax and a minimum Vtmin. The deceleration Vt setting (Vt<Vm) is indicated by a solid line in FIGS. 8 and 9, while the acceleration Vt setting (Vt>Vm) is indicated by a dotted line in FIG. 10. If desired, the acceleration control indicated by the dotted line may be omitted and only the deceleration control indicated by the solid line may be present.

In this embodiment, the timing of the application of the adjustment voltage Vt was selected as the actuator passes the previous layer to the recording layer of the jump destination. However, in case of a multi-layer disk, the adjustment voltage Vt can be applied as the actuator passes a recording layer that precedes the jump destination by two layers or more, following the measurement of the period T.

As the movement speed in the last part of the jump operation (especially right before the termination) is optimally adjusted, the actuator can arrive at a desired recording layer very stably.

The following will now describe a focus control (layer jump) procedure in the embodiments 1 and 2 referring a relevant flowchart.

Figure 12:
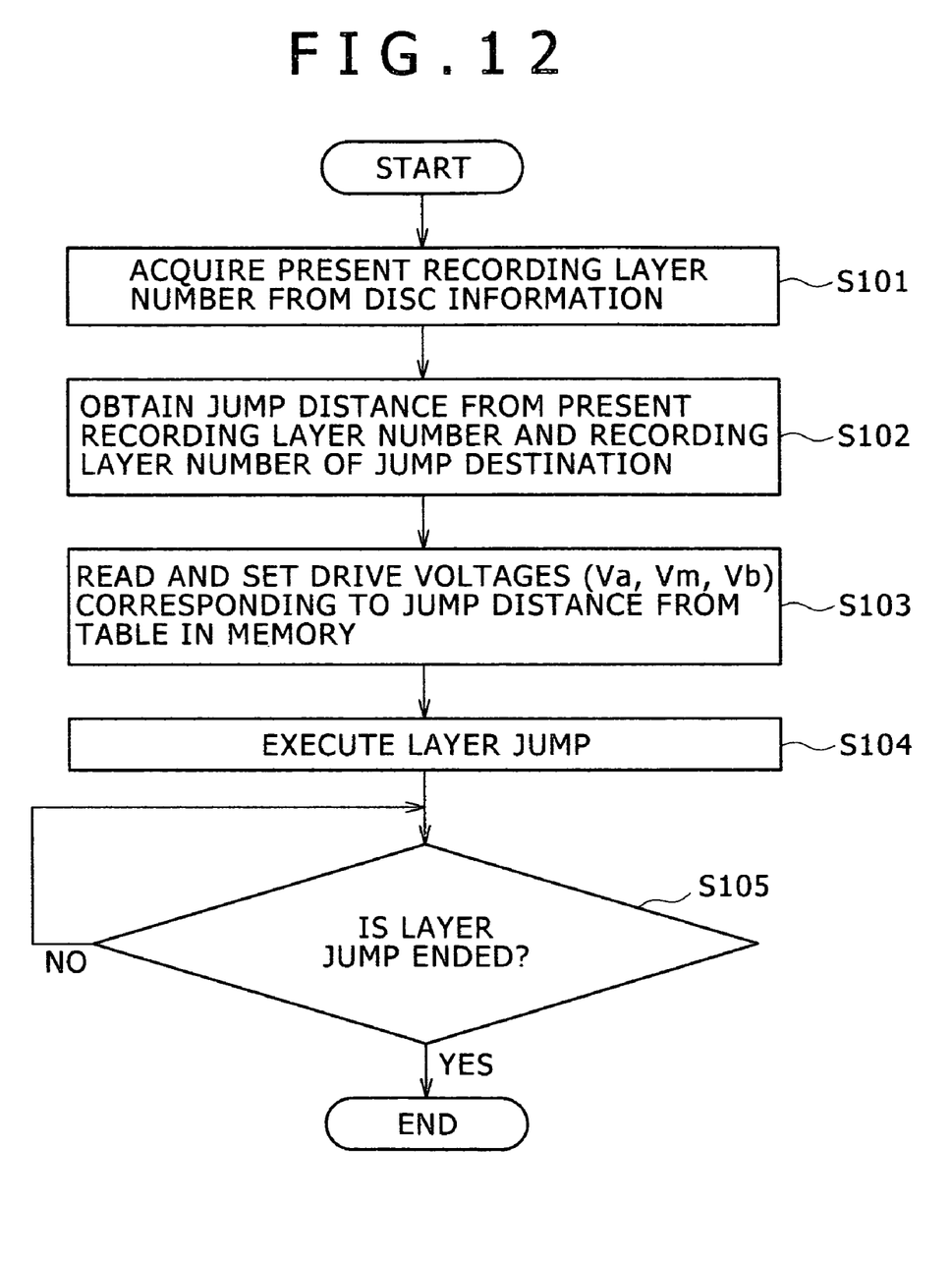
FIG. 12 is a flowchart describing a focus control method (layer jump)

FIG. 12 is a flowchart describing the overall focus control method from receiving a command of a layer jump to actually carrying out it. In detail, when the optical disk apparatus receives a layer jump command from the host computer 14, it reads out information from the disk and acquires a recording layer number at the present focus (jump source) (S101). And, a jump distance is obtained based on a desired recording layer number (jump destination) (S102). Next, the apparatus reads out driving parameters (driving voltages Va, Vm and Vb) corresponding to the jump distance from the table in the memory 20 (S103). This is possible because the table retains information of all driving parameters in form as shown in FIG. 4. Thus, knowing the layer jump pattern (recording layer numbers of jump source and jump destination) is sufficient to read out the jump distance and the driving parameters. Once the driving parameters are acquired, the driving voltages Va, Vm and Vb are sequentially set to the actuator and the jump operation is carried out (S104). The apparatus reads out information from the disk to judge whether the actuator has arrived at a desired recording layer (S105), and ends the jump operation. Then, the apparatus executes a focus servo control from that position and proceeds with data recording/reproduction.

Figure 13:
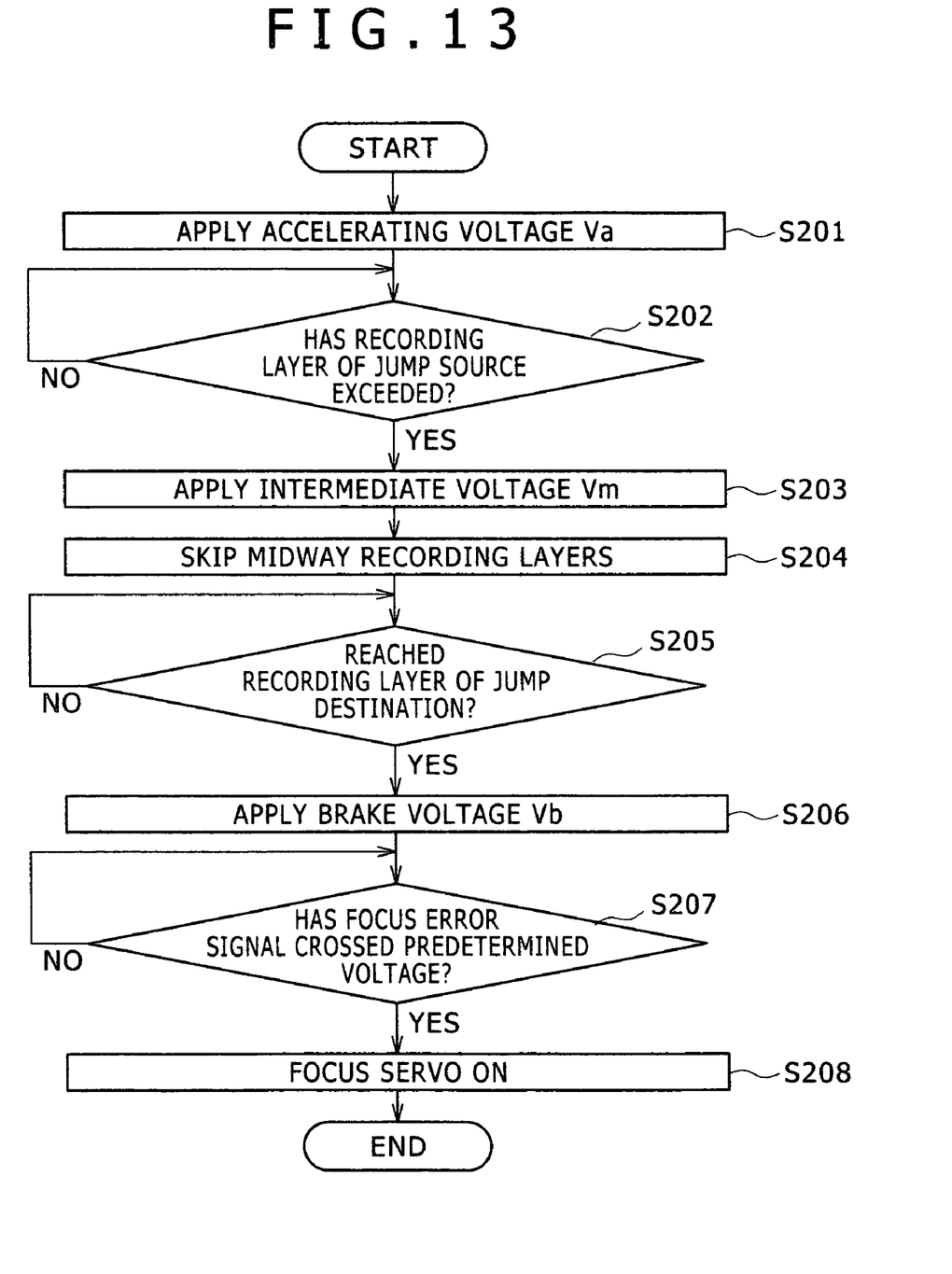
FIG. 13 is a flowchart describing a focus control method (layer jump)

FIG. 13 is a flowchart explaining in detail the layer jump operation (S104) in FIG. 12 of the embodiment 1.

The actuator starts driving by the acceleration voltage Va applied as part of the driving parameters read out from the table (S201). The apparatus judges from an FE signal waveform whether or not the actuator has passed the recording layer area of the jump source (S202). If yes (for instance, the S-shaped waveform of the FE signal is disappeared), the intermediate voltage Vm is now applied (S203). The actuator keeps moving at the same speed while skipping the midway recording layers (S204). Whether to skip certain recording layers is known by the given jump condition. Moreover, the number of layers to be skipped can be found by counting the number of occurrences of the S-shaped waveform of the FE signal. That is, the apparatus judges from the waveform of the FE signal whether the actuator has reached near the recording layer of jump destination (S205). If it turns out that the actuator is getting close to the recording layer of jump destination (the S-shaped waveform of the FE signal occurs), the apparatus applies the brake voltage Vb in order to decelerate the actuator (S206). Lastly, the apparatus judges whether the FE signal has crossed a predetermined level (for instance, zero level) (S207), and if the predetermined level is reached, the apparatus turns off the brake voltage Vb and turns to a focus servo control (S208).

Figure 14:
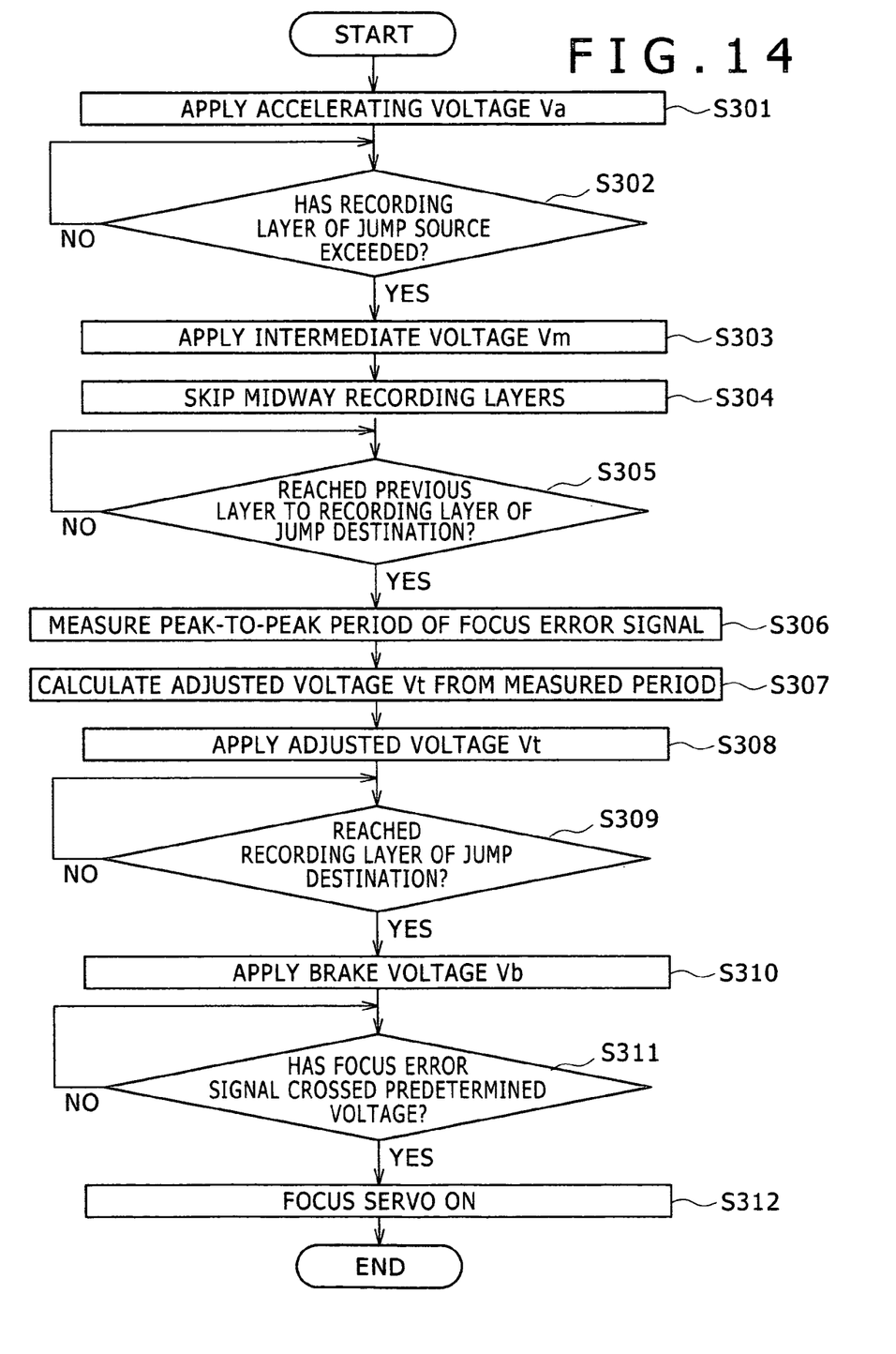
FIG. 14 is a flowchart describing a focus control method (layer jump)

FIG. 14 is a flowchart explaining in detail the layer jump operation (S104) in FIG. 12 of the embodiment 2.

Since the steps S301 through S304 are same as the steps S201 through S204 in FIG. 13, their explanations are omitted. Following these steps, the apparatus judges whether a recording layer being skipped on the way is the previous layer to the recording layer of jump destination (S305). If so, the apparatus measures the peak-to-peak period T (time width) of the S-shaped waveform of the FE signal (S306). The adjustment voltage Vt is calculated from the period T measurement (S307), and the applied voltage is changed to Vt (S308). Here, the Vt is calculated using the equation in FIG. 11. The subsequent steps S309 through S312 are same as the steps S205 through S208 in FIG. 13.

Embodiment 3

To more stably execute the layer jump operation, information on the interlayer distances may be recorded on the optical disk itself. This information is then used for setting driving parameters.

Figure 15A:
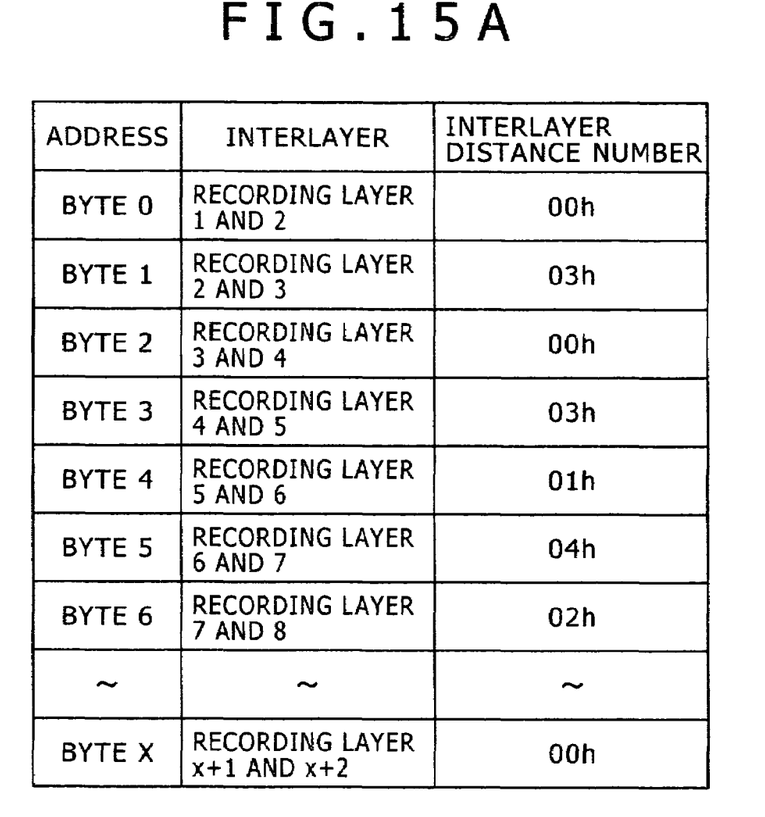
FIGS. 15A and 15B are explanatory diagrams showing a case in which an optical disk stores information of interlayer distances.

FIG. 15A is a diagram showing an example of information about interlayer distances recorded on the optical disk. That is, all interlayer distances at a disk are recorded in a management information region of the disk itself. For instance, a recording address on the disk starts from an arbitrary value given by standards, and an interlayer number is recorded there per byte. As shown in FIG. 15A, which byte indicates which interlayer is also set according to the standards in advance.

Figure 15B:
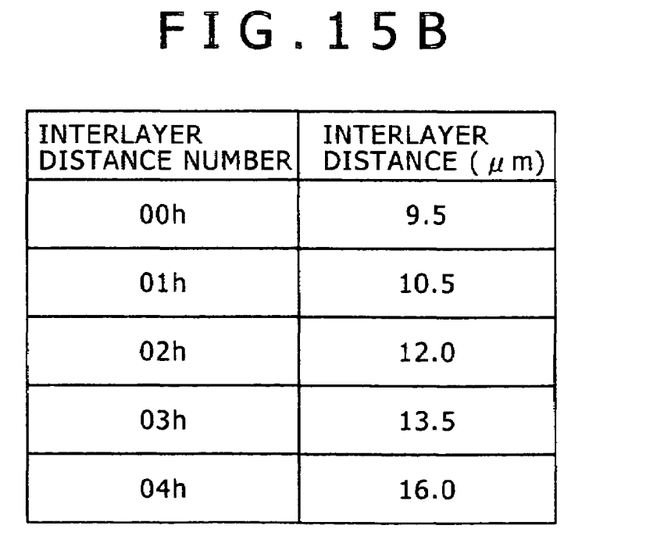

FIG. 15B illustrates a coding table showing interlayer distance numbers and interlayer distances in one-to-one correspondence. This coding table is regulated as the physical standards of a disk, and is stored in a memory of the optical disk in advance. For example, when the interlayer number is read out, the coding table in the memory provides a corresponding interlayer distance. Next, referring to the table of driving parameters shown in FIG. 4, an adequate driving voltage is read out.

In case of this embodiment, the information of interlayer distances is recorded in the optical disk itself, so that the apparatus may read out the information, thereby making the driving condition setting easy and quick.

Although the embodiments explained so far were based on the assumption that the targeted optical disk has at least three recording layers and the interlayer distances among the recording layers are not uniform, the present invention is not limited thereto. The present invention can be equally applied to disks, in which each disk has at least three recording layers and has uniform interlayer distances among the recording layers, and even interlaced jumps are carried out. Similarly, the present invention can be applied to disks, in which each disk has at least two recording layers and has different interlayer distances, respectively.

In addition, even though the driving parameters in each embodiment were set by reading out of the table prepared in advance, they can be set by the equation according to jump distances. In that is the case, it is possible to react to any random jump distance.

What is claimed is:
1. An optical disk apparatus recording and reproducing data onto and from an optical disk with at least three recording layers and non-uniform interlayer distances between respective recording layers, the apparatus comprising:
a disk motor which rotates the optical disk;
a pickup which condenses a laser beam onto an objective lens and irradiates the laser beam onto a desired recording surface of the optical disk for data recording/reproduction;
a signal processing circuit which processes the recorded/reproduced data and, at the same time, generates a focus error signal from a signal detected by the pickup;
a control unit which drives an actuator based on the focus error signal and thereby, controls a focus position of the objective lens; and
a memory which stores interlayer distances and driving voltages corresponding to all of the combination of jump patterns of at least three recording layers within the optical disk in advance,
wherein, the optical disk has a distance between one recording layer and another recording layer being different from the distance between the another recording layer and a further layer; and
wherein, when a layer jump is carried out from the one recording layer to the further recording layer of the optical disk, with the another recording layer being arranged between the one recording layer and the further recording layer, the control unit reads out the driving voltages from the memory and sets the driving voltages, the driving voltages correspond to the combination of one recording layer and further recording layer; and
wherein the driving voltages comprise an acceleration voltage for a start-up process, an intermediate voltage and a brake voltage for a stopping process; and wherein the acceleration voltage, the intermediate voltage and the brake voltage vary respectively depending on the combination pattern of the at least three recording layers.

2. The optical disk apparatus according to claim 1, wherein, when a layer jump is carried out from the one recording layer to the another recoding layer while skipping a third layer midway therebetween, the control unit obtains a speed passing the third recording layer and adjusts the driving voltage according to the passing speed.

3. The optical disk apparatus according to claim 2, wherein the passing speed is obtained from a period of a focus error signal waveform generated by the signal processing circuit.

4. A focus control method of an optical disk with at least three recording layers and non-uniform interlayer distances between respective recording layers, the method comprising steps of:
   storing interlayer distances and driving voltages corresponding to all of the combination of jump patterns of at least three recording layers within the optical disk in advance;
   when a layer jump is carried out from one recording layer to another recording layer and from the another recording layer to a further recording layer of the optical disk and from the one recoding layer to the further recording layer with the another recording layer therein between, reading out the driving voltages from the memory and setting the driving voltages corresponding to the combination of one recording layer and another recording layer and one recording layer and further recording layer; and
   carrying out the layer jump with the set driving voltages,
   wherein the driving voltages comprise an acceleration voltage for a start-up process, an intermediate voltage and a brake voltage for a stopping process; and
   wherein the acceleration voltage, the intermediate voltage and the brake voltage vary respectively depending on the combination pattern of the at least three recording layers.

5. The focus control method according to claim 4, further comprising steps of:
   when a layer jump is carried out from the one recording layer to the another recording layer while skipping a third layer midway therebetween, obtaining a speed passing the third recording layer; and
   adjusting the driving voltage according to the passing speed.

6. The focus control method according to claim 5, wherein the passing speed is obtained from a period of a focus error signal waveform generated by a signal processing circuit.

7. An optical disk having at least three recording layers and non-uniform interlayer distances between respective recording layers,
   wherein, the optical disk has a distance between one recording layer and another recording layer being different from the distance between the another recording layer and a further layer; and
   wherein information of the interlayer distances between the respective recording layers is recorded in a management information region, which includes all of the combination of jump patterns of at least three recording layers on the optical disk.

* * * * *